(12) United States Patent
Shingai et al.

(10) Patent No.: US 7,083,894 B2
(45) Date of Patent: Aug. 1, 2006

(54) OPTICAL RECORDING MEDIUM

(75) Inventors: Hiroshi Shingai, Tokyo (JP); Hajime Utsunomiya, Tokyo (JP)

(73) Assignee: TDK Corporation, Tokyo (JP)

( * ) Notice: Subject to any disclaimer, the term of this patent is extended or adjusted under 35 U.S.C. 154(b) by 193 days.

(21) Appl. No.: 10/460,167

(22) Filed: Jun. 13, 2003

(65) Prior Publication Data

US 2003/0232278 A1    Dec. 18, 2003

(30) Foreign Application Priority Data

Jun. 14, 2002    (JP) .............................. 2002-173801

(51) Int. Cl.
G11B 7/24    (2006.01)

(52) U.S. Cl. ................. 430/270.12; 430/945; 428/645; 369/275.2

(58) Field of Classification Search ........... 430/270.13, 430/945; 428/64.5; 369/275.2
See application file for complete search history.

(56) References Cited

U.S. PATENT DOCUMENTS

| | | |
|---|---|---|
| 4,460,636 A | 7/1984 | Watanabe |
| 4,860,274 A | 8/1989 | Kobayashi |
| 4,947,372 A | 8/1990 | Koshino et al. |
| 5,058,061 A | 10/1991 | Koshino et al. |
| 5,072,423 A | 12/1991 | Koshino et al. |
| 5,138,572 A | 8/1992 | Koshino et al. |
| 5,418,030 A | 5/1995 | Tominaga et al. |
| 5,498,507 A | 3/1996 | Handa et al. |
| 5,569,517 A | 10/1996 | Tominaga et al. |
| 5,637,371 A | 6/1997 | Tominaga et al. |
| 5,912,104 A | 6/1999 | Hirotsune et al. |
| 5,958,649 A | 9/1999 | Hirotsune et al. |
| 6,096,399 A | 8/2000 | Yoshinari et al. |
| 6,232,035 B1 | 5/2001 | Hirotsune et al. |
| 6,383,595 B1 | 5/2002 | Hirotsune et al. |
| 6,770,346 B1* | 8/2004 | Harigaya et al. .......... 428/64.1 |
| 2001/0016242 A1 | 8/2001 | Miyamoto et al. |
| 2002/0012305 A1 | 1/2002 | Shingai et al. |
| 2003/0043712 A1 | 3/2003 | Nakamura et al. |
| 2003/0124458 A1* | 7/2003 | Ichijo et al. ........... 430/270.13 |
| 2003/0180473 A1 | 9/2003 | Nishihara et al. |
| 2003/0198176 A1* | 10/2003 | Nagata et al. ........... 369/275.2 |
| 2003/0224292 A1* | 12/2003 | Shingai et al. ......... 430/270.12 |

(Continued)

FOREIGN PATENT DOCUMENTS

EP    0271630    6/1988

(Continued)

OTHER PUBLICATIONS

Song et al. "Perpendicular magnetic anisotropy and magneto-optical Kerr effect of MnSbAg alloy films with NiAs stracture", IEEE Trans. Magnet. vol. 35(5) pp. 3133-3135 (Sep. 1999).*

(Continued)

*Primary Examiner*—Martin Angebranndt
(74) *Attorney, Agent, or Firm*—Greenblum & Bernstein, P.L.C.

(57) ABSTRACT

There is provided an optical recording medium having a phase-change recording layer formed based on a drastically new concept of making the content of Mn still higher than the prior art while using Sb as a main component. The optical recording medium has a recording layer composed of a plurality of elements, and the recording layer contains Sb, and also has an Mn content of more than 20 atomic % but not more than 40 atomic %, on condition that the total amount of all the elements composing the recording layer is 100 atomic %.

3 Claims, 3 Drawing Sheets

U.S. PATENT DOCUMENTS

2004/0053166 A1    3/2004    Shingai et al.
2004/0191689 A1*   9/2004    Shingai et al. ......... 430/270.13
2004/0208105 A1*   10/2004   Shingai et al. ........... 369/59.11

FOREIGN PATENT DOCUMENTS

| | | | |
|---|---|---|---|
| EP | 0352105 | | 1/1990 |
| EP | 1132904 | * | 9/2001 |
| EP | 1143432 | | 10/2001 |
| EP | 1158506 | | 11/2001 |
| EP | 1189216 | | 3/2002 |
| EP | 1260973 | | 11/2002 |
| EP | 1281537 | | 2/2003 |
| JP | 02 178086 | | 7/1980 |
| JP | 60-177446 | | 9/1985 |
| JP | 61-115317 | | 6/1986 |
| JP | 62-246788 | | 10/1987 |
| JP | 63-155437 | | 6/1988 |
| JP | 63-155439 | | 6/1988 |
| JP | 63-167440 | * | 7/1988 |
| JP | 63-244422 | | 10/1988 |
| JP | 01-025328 | * | 1/1989 |
| JP | 01-025329 | * | 1/1989 |
| JP | 64-035746 | | 2/1989 |
| JP | 64-086340 | | 3/1989 |
| JP | 1-224940 | | 9/1989 |
| JP | 02-167790 | * | 6/1990 |
| JP | 06-060419 | * | 3/1994 |
| JP | 8-224961 | | 9/1996 |
| JP | 10326436 | | 12/1998 |
| JP | 2000-043415 | | 2/2000 |
| JP | 200190637 | | 7/2000 |
| JP | 2000-313170 | | 11/2000 |
| JP | 2001-039031 | | 2/2001 |
| JP | 2001-189042 | | 7/2001 |
| JP | 2002-347341 | | 12/2002 |
| WO | 0185464 | | 11/2001 |

OTHER PUBLICATIONS

English Language Abstract of -JP-10-326436.
English Language Abstract of -JP-2000-190637.
English Language Abstract of -JP-8-224961.
English Language Abstract of JP 2001-039031, published Feb. 13, 2001.
English Language Abstract of JP 61-246788, published Oct. 27, 1987.
English Language Abstract of JP 64-035746, published Feb. 6, 1989.
English Language Abstract of JP 63-155439, published Jun. 28, 1988.
English Language Abstract of JP 64-086340, published Mar. 31, 1989.
English Language Abstract of JP 63-244422, published Oct. 11, 1988.
English Language Abstract of JP 1-224940, published Sep. 7, 1989.
English Language Abstract of JP 2001-189042, published Jul. 10, 2001.
English Language Abstract of JP 2002-347341, published Dec. 4, 2002.
English Language Abstract of JP 63-155437, published Jun. 28, 1988.
English Language Abstract of JP 60-177446, published Nov. 9, 1985.
English Language Abstract of JP 63-331063, filed Dec. 29, 1988.
English Language Abstract of JP 61-115317 A.

* cited by examiner

F I G. 1
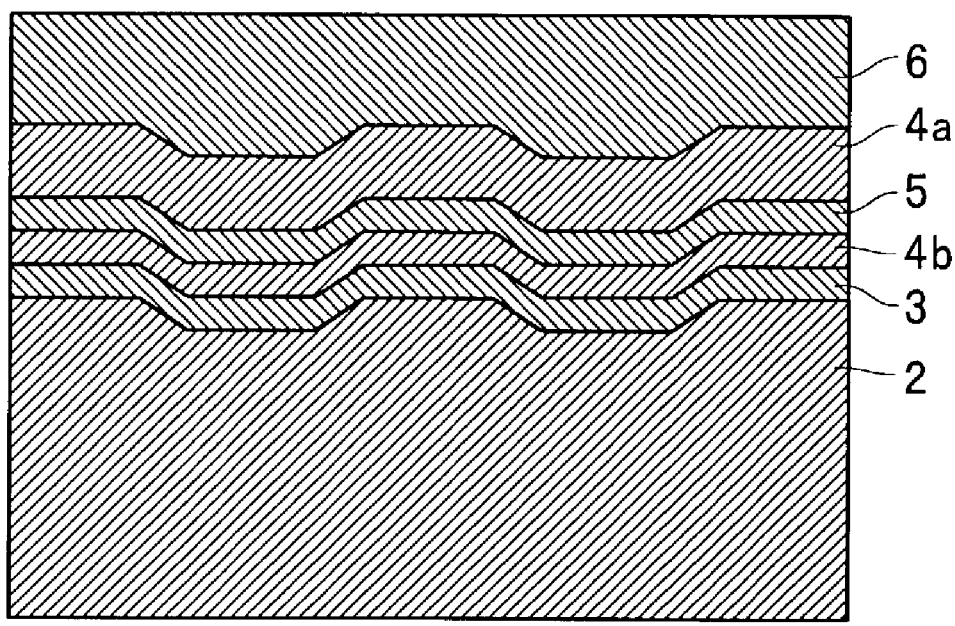

FIG. 2

| SAMPLE No. | RECORDING LAYER : $Sb_aMn_bTe_c/Sb_aMn_dTe_e$ (ATOMIC%) | | | | | REWRITING SPEED (Mbps) | CRYSTALLIZATION TEMPERATURE (°C) | ACTIVATION ENERGY (eV) |
|---|---|---|---|---|---|---|---|---|
| | a | b | c | LOWER LIMIT VALUE OF d, e | UPPER LIMIT VALUE OF d, e | | | |
| 1 (COMPARATIVE EXAMPLE) | 90 | 10 | 0 | | | ≫200 | | |
| 2 (COMPARATIVE EXAMPLE) | 80 | 20 | 0 | | | 100 | | |
| 3 | 70 | 30 | 0 | 4.24 | 25.8 | 10~35 | | |
| 4 | 60 | 40 | 0 | 10.7 | 29.3 | 10~35 | | |
| 5 (COMPARATIVE EXAMPLE) | 50 | 50 | 0 | 17.2 | 32.8 | 10~35 | | |
| 6 (COMPARATIVE EXAMPLE) | 81 | 9 | 10 | | | 210 | <100 | 1.73 |
| 7 (COMPARATIVE EXAMPLE) | 72 | 18 | 10 | 2.95 | 25.1 | 105~140 | 176 | 2.78 |
| 8 | 63 | 27 | 10 | 8.76 | 28.2 | 70~105 | 231 | 3.64 |
| 9 | 54 | 36 | 10 | 14.6 | 31.4 | 35 | 265 | 2.10 |
| 10 (COMPARATIVE EXAMPLE) | 80 | 0 | 20 | | | 210 | 146 | 0.98 |
| 11 (COMPARATIVE EXAMPLE) | 72 | 8 | 20 | 2.95 | 25.1 | 210 | 186 | 1.83 |
| 12 (COMPARATIVE EXAMPLE) | 64 | 16 | 20 | 8.12 | 27.9 | 210 | 213 | 2.66 |
| 13 | 56 | 24 | 20 | 13.3 | 30.7 | 210 | 242 | 3.82 |
| 14 | 48 | 32 | 20 | 18.5 | 33.5 | 70~105 | 259 | 2.17 |
| 15 | 40 | 40 | 20 | 23.6 | 36.4 | 10~35 | | |
| 16 (COMPARATIVE EXAMPLE) | 70 | 0 | 30 | 4.24 | 25.8 | 35 | 166 | 1.56 |
| 17 (COMPARATIVE EXAMPLE) | 63 | 7 | 30 | 8.76 | 28.2 | 70~105 | 186 | 3.62 |
| 18 (COMPARATIVE EXAMPLE) | 56 | 14 | 30 | 13.3 | 30.7 | 70~105 | 191 | 2.95 |
| 19 | 49 | 21 | 30 | 17.8 | 33.2 | 175~210 | 230 | 2.57 |
| 20 | 42 | 28 | 30 | 22.3 | 35.7 | 210 | 247 | 2.25 |
| 21 | 35 | 35 | 30 | 26.9 | 38.2 | 115 | | |
| 22 (COMPARATIVE EXAMPLE) | 60 | 0 | 40 | 10.7 | 29.3 | 35 | 159 | 3.11 |
| 23 (COMPARATIVE EXAMPLE) | 54 | 6 | 40 | 14.6 | 31.4 | 10~35 | | |
| 24 (COMPARATIVE EXAMPLE) | 42 | 18 | 40 | 22.3 | 35.7 | 10~35 | | |
| 25 | 30 | 30 | 40 | 30.1 | 39.9 | 10~35 | | |
| 26 | 20.4 | 39.6 | 40 | 36.3 | 43.3 | 60 | | |
| 27 (COMPARATIVE EXAMPLE) | 40 | 0 | 60 | 23.6 | 36.4 | 10~35 | | |

OPTICAL RECORDING MEDIUM

BACKGROUND OF THE INVENTION

1. Field of the Invention

This invention relates to an optical recording medium having a phase-change recording layer.

2. Description of the Related Art

In recent years, attention has been drawn to optical recording media on which high-density recording as well as additional writing and rewriting (overwriting) of recording information can be performed. The additionally writable and rewritable optical recording media include a phase-change optical recording medium on which information (recording information) is recorded by changing a crystalline state of a recording layer thereof by irradiation of a laser beam thereto, and from which the recorded information is reproduced by detecting the difference of reflectivity caused by the changes in the crystalline state. This phase-change optical recording medium captures attention particularly with the capability of rewriting by modulation of the intensity of a single laser beam, and the capability of recording and reproducing information using an optical system having a simpler construction than an optical system for a magneto-optical recording medium.

In general, to record information on a rewritable phase-change optical recording medium, first, a whole recording layer is initialized to a crystalline state, and then a laser beam having a power (recording power) high enough to heat the recording layer to a temperature above a melting point is irradiated onto the phase-change optical recording medium. At this time, the recording layer of portions of the recording medium onto which the laser beam having the recording power is irradiated is melted, and then rapidly cooled, whereby amorphous recording marks are formed. On the other hand, to erase the recording marks from the rewritable phase-change optical recording medium, a laser beam having a power (erasing power) which can heat the recording layer to a temperature above a crystallization temperature is irradiated to the phase-change optical recording medium. At this time, the recording layer of portions of the recording medium onto which the laser beam having the erasing power is irradiated is heated to the temperature above the crystallization temperature, and then slowly cooled, whereby the recording marks (amorphous portions) are returned to the crystalline state (i.e. erased). Thus, in the rewritable phase-change optical recording medium, it is possible to perform rewriting by modulating the intensity of a single optical beam.

In a phase-change optical recording medium of the above type, as disclosed e.g. in Japanese Laid-Open Patent Publications (Kokai) No. 10-326436 and No. 8-224961, a chalcogenide compound, such as a Ge-Sb-Te-based material or an Ag-In-Sb-Te-based material, which contains Sb as a main component and chalcogen, such as Te or Se, as another main component, is generally used to form a phase-change recording layer, due to a large difference in reflectance between the crystalline state and the amorphous state and relatively high stability of the amorphous state. Today, as described above, it is taken for granted by those skilled in the art that a phase-change recording layer should contain chalcogen. Further, it is also known that various elements including Mn are added as additive elements to the Ge-Sb-Te-based material or the Ag-In-Sb-Te-based material, as disclosed in the above-mentioned publications (Japanese Laid-Open Patent Publication (Kokai) No. 10-326436, etc.). These additive elements are used for effects, such as increasing the crystallization speed(speed of crystal transformation) and enhancing stability against aging. However, too much addition of such additive elements degrades other characteristics or properties of the recording layer. To avoid this, in both of the above-mentioned publications, there is a description limiting the amount of additive elements to 20 atomic % or less.

However, through evaluation of various phase-change optical recording media prepared by changing other component elements than Sb contained in a recording layer as a main component and/or the composition ratio of elements composing a recording layer, the present inventor found that by making the content of Mn still higher, it is possible to form a recording layer having recording characteristics (including rewriting speed and thermal stability) as excellent as or more excellent than those of conventional phase-change recording layers.

SUMMARY OF THE INVENTION

It is an object of the present invention to provide an optical recording medium having a phase-change recording layer formed based on a drastically new concept of making the content of Mn still higher than the prior art while using Sb as a main component.

To attain the above object, according to a first aspect of the invention, there is provided an optical recording medium having a recording layer composed of a plurality of elements, wherein the recording layer contains Sb, and also has an Mn content of more than 20 atomic % but not more than 40 atomic %, on condition that a total amount of all the elements composing the recording layer is 100 atomic %.

According to this optical recording medium, the recording layer is formed such that it contains Sb and also has an Mn content of more than 20 atomic % but not more than 40 atomic %. This makes it possible to increase the crystallization temperature and the rewriting speed, through the use of Mn, which has been conventionally regarded as a mere additive element, to respective levels equal to or higher than those of optical recording media having a recording layer containing chalcogen as a main component.

Preferably, the recording layer contains at least one of Te and Ge.

According to this preferred embodiment, since the recording layer contains at least one of Te and Ge, it is possible to further increase the rewriting speed of the recording medium.

To attain the above object, according to a second aspect of the present invention, there is provided an optical recording medium having a recording layer composed of a plurality of elements, wherein the recording layer contains Sb, Mn, and Te, and is formed such that conditions of $20 \leq a < 80$, $20 < b \leq 40$, $0 \leq c \leq 40$, and $a+b+c=100$ are satisfied, when a composition of the recording layer is expressed by $Sb_aMn_bTe_c$, and a, b, and c are expressed in terms of atomic %.

According to this optical recording medium, when the composition of the recording layer is expressed by $Sb_aMn_bTe_c$, and a, b and c are expressed in terms of atomic %, a, b and c are set such that $20 \leq a < 80$, $20 < b \leq 40$, $0 \leq c \leq 40$, and $a+b+c=100$ hold. This makes it possible to increase the crystallization temperature and the rewriting speed, through the use of Mn, which has been conventionally regarded as a mere additive element, to respective levels equal to or higher than those of optical recording media having a recording layer containing chalcogen as a main component.

Preferably, the recording layer is formed such that conditions of $-0.646a+49.46 \leq d \leq -0.354a+50.54$, $-0.646a+$ $49.46 \leq e \leq -0.354a+50.54$, $d \geq 0$, $e \geq 0$, and $d+e=100-a$ are satisfied, when the composition of the recording layer is expressed by $Sb_aMn_dTe_e$, and d and e are expressed in terms of atomic %.

According to this preferred embodiment, when the composition of the recording layer is expressed by $Sb_aMn_dTe_e$, and d and e are expressed in terms of atomic %, d and e are set such that $-0.646a+49.46 \leq d \leq -0.354a+50.54$, $-0.646a+49.46 \leq e \leq -0.354a+50.54$, $d \geq 0$, $e \geq 0$, and $d+e=100-a$ hold, whereby it is possible to provide an optical recording medium which offers a still higher rewriting speed in a range of approximately 100 Mbps to approximately 200 Mbps.

More preferably, the recording layer contains at least element M selected from the group consisting of In, Ag, and Ge, as an additive element, and is formed such that a condition of $0<f \leq 15$ is satisfied, when a composition of the recording layer is expressed by $(Sb(MnTe))_{100-f}M_f$, and f is expressed in terms of atomic %.

According to this preferred embodiment, the recording layer contains at least one element M selected from the group consisting of In, Ag and Ge, as an additive element, and is formed such that $0<f \leq 15$ holds, when the composition of the recording layer is expressed by $(Sb(MnTe))_{100-f}M_f$, and f is expressed in terms of atomic %. This makes it possible to further improve storage characteristics of the recording medium.

It should be noted that the disclosure of the present specification relates to the subject included in Japanese Patent Application No. 2002-173801 which was filed on Jun. 14, 2002, and all of the disclosure thereby is expressly incorporated herein by reference.

BRIEF DESCRIPTION OF THE DRAWINGS

These and other objects and features of the present invention will be explained in more detail below with reference to the attached drawings, wherein:

FIG. 1 is a cross-sectional view showing the construction of a recording medium according to an embodiment of the invention;

FIG. 2 is a diagram of a table showing results of experiments, which is useful for explaining the relationship between the composition of a recording layer of each sample, and the rewriting speed, crystallization temperature, and activation energy of the recording layer;

DESCRIPTION OF THE PREFERRED EMBODIMENT

Figure 3:
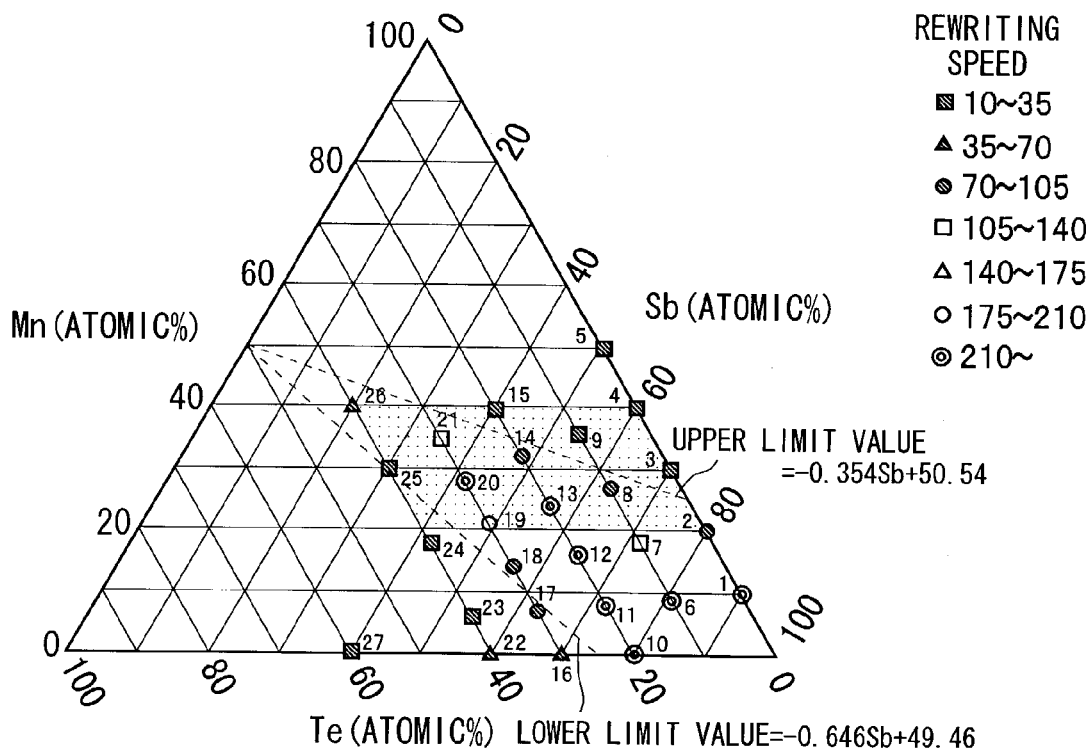
FIG. 3 is a 3-component composition diagram useful for explaining the relationship between the composition of the recording layer and the rewriting speed.

An optical recording medium according to the present invention includes a recording layer containing at least Sb and Mn, and further Te. More specifically, the composition of the recording layer of the optical recording medium is expressed by the following formula (1):

$$Sb_aMn_bTe_c \qquad (1)$$

wherein a, b and c are expressed in terms of atomic %. In the above formula, a, b and c are defined to satisfy the following conditions:

$20 \leq a < 80$ $20 < b \leq 40$ $0 \leq c \leq 40$ $a+b+c=100$

If the content a of Sb is too little in the above formula (1), the crystallization speed is sharply reduced, which makes it difficult to erase or rewrite recording information. Therefore, it is preferred that the content a of Sb is set to 20 atomic % or more. On the other hand, it is known that if the content a of Sb is too much, a change in reflectance caused by a phase change becomes small, which reduces the degree of modulation of the recording layer.

Further, if the content b of Mn is too little in the above formula (1), the effect of improving thermal stability cannot be sufficiently obtained, which degrades storage characteristics. So long as the content b of Mn is more than 20 atomic %, it is possible to positively ensure sufficient thermal stability. On the other hand, if the content b of Mn is too much, the crystallization speed becomes low, which makes it difficult to erase recording information. Therefore, in order to ensure a sufficient crystallization speed while maintaining excellent thermal stability, it is preferred that the content b of Mn is set to more than 20 atomic % but not more than 40 atomic %.

Further, it is preferable that Te, which has the effect of increasing the degree of modulation, is contained in the recording layer. However, if the content c of Te is too much, the crystallization speed becomes too low, which makes it difficult to erase recording information. Therefore, in order to maintain a sufficient crystallization speed, it is preferred that the content c of Te is set to 40 atomic % or less.

From the above, to sufficiently improve thermal stability through addition of Mn, it is necessary to cause Mn to be contained in the recording layer in excess of 20 atomic %, and hence it is necessary to set the content a of Sb to be less than 80 atomic %.

Further, if the content c of Te is increased, the crystallization speed is lowered. However, when attention is paid to the ratio between the content b of Mn and the content c of Te, if the content b of Mn and the content c of Te is approximately 1:1, that is, if the composition ratio (b:c) between Mn and Te is set to be in the vicinity of 50:50, it is possible to increase the crystallization speed. For this reason, it is preferred that the content c of Te is increased with an increase in the content b of Mn, or decreased with a decrease in the same. More specifically, the composition of the recording layer is further expressed from a viewpoint different from that of the above formula (1) by the following formula (2):

$$Sb_aMn_dTe_e \qquad (2)$$

wherein when d and e are expressed in terms of atomic %. In the above formula (2), the composition ratio between Mn and Te is set to satisfy the following conditions:

$-0.646a+49.46 \leq d \leq -0.354a+50.54$ $-0.646a+49.46 \leq e \leq -0.354a+50.54$ $d \geq 0$ $e \geq 0$ $d+e=100-a$ This configuration makes it possible to simultaneously attain a further increased crystallization speed (or increased rewriting speed) and excellent thermal stability. For example, it is possible to increase the rewriting speed up to a range of approximately 100 Mbps to approximately 200 Mbps while maintaining the crystallization temperature above 200° C. Thus, a recording layer can be realized which enables high-speed rewriting and at the same time has excellent storage characteristics.

Further, the recording layer can contain not only the above elements, but also other elements added thereto as required. As such additive elements, there may be mentioned at least one element (element M) selected from the group consisting of Ge, In, and Ag. These additive elements have a function of increasing the crystallization temperature of the recording layer, thereby further enhancing the storage characteristics of the recording medium. If the content of these additive elements is too much, a change in reflectance caused by a phase change becomes small, which makes it difficult to obtain a sufficient degree of modulation of the recording layer. Therefore, it is preferred that the content f of the additive elements relative to all the materials composing the recording layer is set to more than 0 atomic % but not more than 15 atomic %.

Further, it is preferred that the recording layer is formed to have a thickness within a range of 4 to 50 nm, and it is more preferred that the thickness is within a range of 5 to 30 nm. When the thickness is too small, growth of the crystalline phase is made difficult, and the difference of reflectivity caused by the phase change becomes insufficient. On the other hand, when the thickness is too large, the thermal conductivity of the recording layer is increased, and the reflectivity and the degree of modulation are reduced, which makes it difficult to perform the recording.

It should be noted that the composition of the recording layer can be measured by EPMA (Electron Probe Microanalysis), X-ray microanalysis, ICP, or the like. Further, it is preferred that the recording layer is formed by a sputtering method. In this case, sputtering conditions are not particularly limited, but when a material containing a plurality of elements is sputtered, for example, an alloy target may be used, or alternatively, a multi-source sputtering method using a plurality of targets may be employed.

The optical recording medium according to the present invention is not particularly limited in construction except for the composition of the recording layer. For example, FIG. 1 shows an example of the construction of a general phase-change optical recording medium 1 according to an embodiment of the invention in which a reflection layer 3, a second dielectric layer 4b, a recording layer 5, a first dielectric layer 4a, and a light transmission layer 6 are sequentially deposited on a substrate 2. In this optical recording medium 1, a laser beam for recording/reproduction is irradiated to the recording layer 5 via the light transmission layer 6. However, it is also possible to construct an optical recording medium adapted to irradiation of a laser beam for recording/reproduction to a recording layer thereof via a substrate. In this case, although not shown, a first dielectric layer, a recording layer, a second dielectric layer, a reflection layer, and a protective layer are sequentially deposited on the substrate in the mentioned order from the substrate side.

EXAMPLES

The invention will now be described in detail by giving examples.

Experiment 1

A polycarbonate disk having a diameter of 120 mm and a thickness of 1.1 mm, which was formed by injection molding such that grooves were simultaneously formed therein, was used as a substrate 2, and on the surface of the substrate 2, there were sequentially formed a reflection layer 3, a second dielectric layer 4b, a recording layer 5, a first dielectric layer 4a, and a light transmission layer 6, as shown in FIG. 1. A plurality of optical recording disks were thus prepared as Samples No. 1 to No. 27. FIG. 2 shows the respective compositions of the recording layers 5 of Samples No. 1 to No. 27, each of which can be expressed by the formula (1). Samples No. 3, No. 4, No. 8, No. 9, No. 13 to No. 15, No. 19 to No. 21, No. 25 and No. 26 are Examples of the invention, and Samples No. 1, No. 2, No. 5 to No. 7, No. 10 to No. 12, No. 16 to No. 18, No. 22 to No. 24, and No. 27 are Comparative Examples.

The reflection layer 3 was formed by a sputtering method in an Ar atmosphere. A composition of Ag, Pd and Cu (=98:1:1) was used as a target. Further, the reflection layer 3 was formed to have a thickness of 100 nm.

The second dielectric layer 4b was formed by a sputtering method in an Ar atmosphere by using an $Al_2O_3$ target. Further, the second dielectric layer 4b was formed to have a thickness of 7 nm. The recording layer 5 was formed by a ternary sputtering method in an Ar atmosphere by using an Sb target, an Mn target, and a Te target. Further, the recording layer 5 was formed to have a thickness of 14 nm. The first dielectric layer 4a was formed by a sputtering method in an Ar atmosphere by using a ZnS(80 mol %)—$SiO_2$(20 mol%) target. Further, the first dielectric layer 4a was formed to have a thickness of 110 nm. The light transmission layer 6 was formed from an ultraviolet-curing acrylic resin by a spin coating method.

After the respective recording layers 5 of the samples were initialized (crystallized) using a bulk eraser, the samples were placed on an optical recording medium evaluator, one after another, for recording under the conditions of a laser wavelength of 405 nm, a numerical aperture NA of 0.85, and a recording signal using (1, 7) RLL modulation signal. A recording/erasing linear velocity was optimized on a sample-by-sample basis. Then, a laser beam was irradiated onto each of the samples having data recorded thereon (recorded data) while varying the linear velocity, to erase the data, and when the data was erased up to −30 dB, the linear velocity was measured to thereby calculate a maximum rewriting speed (Mbps). The respective maximum rewriting speeds of the samples are shown in FIG. 2. FIG. 3 show a 3-component composition diagram prepared based on FIG. 2, for illustrating the relationship between the composition of the recording layer 5 and the rewriting speed.

As shown in FIG. 3, even when a recording layer 5 contains Sb and further has an Mn content of more than 20 atomic % but not more than 40 atomic % as in the samples formed as Examples (samples in a dotted area of FIG. 3), so long as the content c of Te is set within a range of $0 \leq c \leq 40$, the rewriting speed exceeds 10 Mbps. It is therefore clear that the recording layer 5 enables rewriting of data similarly to a conventional recording layer containing Sb as a main component and chalcogen, such as Te or Se, as another main component. Further, it is clear from Samples No. 3 and No. 4 that even if a recording layer 5 is formed of Sb and Mn alone without containing chalcogen, the recording layer 5 enables rewriting of data similarly to the conventional recording layer containing chalcogen as another main component.

Moreover, according to the diagram of FIG. 3, when attention is directed out of all Samples No. 1 to No. 27 to those exhibiting very high rewriting speeds (above approximately 140 Mbps), these samples are distributed in an area spreading from the lower right-hand corner of the diagram to the central portion of the same, with a straight line indicating a composition ratio (d:e) of 50:50 between Mn and Te as a center. Particularly, an area where the content of Mn exceeds 20 atomic % shows a distribution of such samples concentrated in the vicinity of this straight line. Therefore, it is understood that in the case of recording layers 5 with an Mn content of more than 20 atomic % but not more than 40 atomic %, it is possible to achieve an extremely high rewriting speed (within a range of approximately 140 Mbps to approximately 200 Mbps) by setting the composition ratio (d:e) between Mn and Te to approximately 50:50. Samples No. 13, No. 19, No. 20, and No. 21 correspond to such recording layers 5. Further, in FIG. 3, when attention is directed to samples exhibiting high rewriting speeds above approximately 100 Mbps, these samples are distributed around the above-mentioned samples exhibiting very high rewriting speeds, and almost all of them are found in an area sandwiched between two broken lines (a broken line indicating lower limit values of the content of Mn=–0.646Sb+49.46 and a broken line indicating upper limit values of the content of Mn=–0.354Sb+50.54) in FIG. 3. Therefore, it is understood that in the case of the recording layers 5 of these samples, it is possible to achieve high-speed rewriting speeds (i.e. increase rewriting speed up to approximately 100 Mbps or higher) by setting the contents d, e of Mn and Te to values within the area sandwiched between the broken lines indicating the lower limit values of the content of Mn=–0.646Sb+49.46 and the upper limit values of the content of Mn=–0.354Sb+50.54) in FIG. 3. Samples No. 8, No. 14 and No. 26 correspond to such recording layers 5 (see FIGS. 2 and 3). It should be noted that although in FIG. 3, an example of specifying the contents of Mn and Te by the broken lines indicating the upper and lower limit values of Mn is illustrated, of course, it is also possible to specify the contents of Mn and Te by using broken lines indicating upper and lower limits of Te (a broken line indicating upper limit values of the content of Te=–0.354Sb+50.54 and a broken line indicating lower limit values of the content of Te=–0.646Sb+49.46).

However, even when the composition ratio (d:e) between Mn and Te is set to approximately 50:50, if the content Sb is set to 40 atomic % or less, the rewriting speed becomes low, and if the content Sb is set to 30 atomic % or less, the rewriting speed becomes still lower. Therefore, the content Sb is set to 20 atomic % or more, preferably to higher than 30 atomic %, and more preferably to higher than 40 atomic %.

Experiment 2

Samples No. 6 to No. 14, No. 16 to No. 20, and No. 22 were each placed on a heating stage. Then, a laser beam was irradiated onto the recording layer 5 of each of the samples via its substrate 2 while increasing the temperature at a rate of 30° C./min, to measure a temperature at which reflectance was changed, whereby the crystallization temperature (° C.) of the recording layer 5 was calculated. Further, the crystallization temperature was measured by varying the rate of temperature rise to 20° C./min, 50° C./min, and 60° C./min, and the activation energy (eV) of the recording layer 5 was calculated by the Arrhenius method, based on the results of the measurement. The crystallization temperature and activation energy of each sample are shown in FIG. 2. A 3-component composition diagram (see FIG. 4) showing the relationship between the crystallization temperature and activation energy, and the composition of each recording layer 5 was also prepared.

Figure 4:
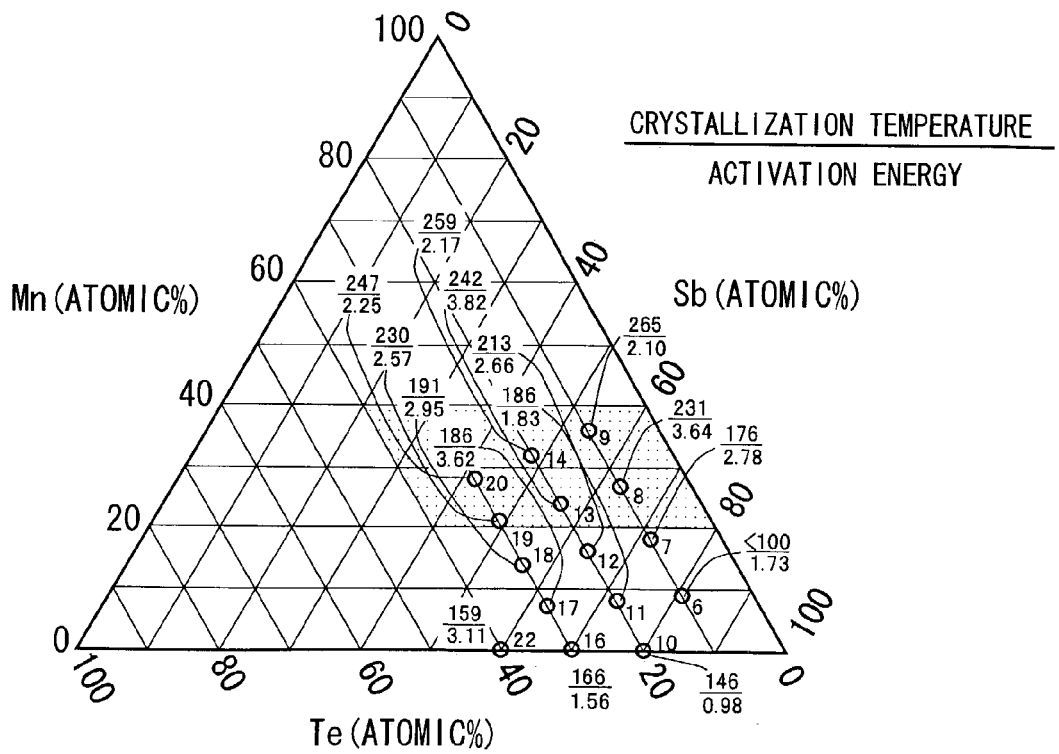
FIG. 4 is a 3-component composition diagram showing the relationship between the composition of the recording layer and the crystallization temperature and activation energy of the recording layer.

From FIG. 4, it is understood that when the content c of Te in the recording layer 5 is constant, the crystallization temperature can be increased by increasing the content b of Mn. It is understood that particularly when the content b of Mn exceeds 20 atomic %, the crystallization temperature positively exceeds 200° C., whereby sufficient thermal stability can be ensured. Further, it is understood from FIG. 4 that by progressively increasing the content b of Mn, it is possible to increase not only the crystallization temperature but also the activation energy up to a point, and when the content b of Mn is further increased, the activation energy can be maintained at a preferable level (above 2.0 eV). The activation energy is required for transition of a substance from an amorphous state to a crystalline state which is more stable. For this reason, however high the crystallization temperature may be, if the activation energy is lowered, the thermal stability of amorphous portions of the recording layer formed by irradiation of a laser beam is impaired. Therefore, it is understood that since not only the crystallization temperature but also the activation energy can be increased up to a certain point, it is possible to ensure excellent thermal stability.

Further, FIGS. 3 and 4 show that by setting the content b of Mn above 20 atomic % and the composition ratio (b:c) between Mn and Te to 50:50 or a value in its vicinity, it is possible to realize a recording layer 5 which has a crystallization temperature of 200° C. or higher and at the same time offers a rewriting speed of higher than 200 Mbps.

It should be noted that although in the above embodiment of the invention, the description has been given by taking the rewritable optical recording medium as an example, it goes without saying that the invention can be applied to a write-once optical recording medium whose requirement of the crystallization speed is lower.

What is claimed is:

1. An optical recording medium having a phase change recording layer composed of a plurality of elements, wherein the recording layer contains Sb, Mn, and Te, and is formed such that conditions of:

$20 \leq a < 80$ $-0.646a+49.46 \leq b \leq -0.354a+50.54$, and $20 < b \leq 40$ $0 \leq c \leq 40$, and $a+b+c=100$ are satisfied, when a composition of the recording layer is expressed by $Sb_a Mn_b Te_c$, and a, b, and c are expressed in terms of atomic %; and the recording layer contains elements M as an additive element, the element M comprising at least Ag, and is formed such that a condition of:

$0 < f \leq 15$ is satisfied, when a composition of the recording layer is expresses by $(Sb(MnTe))_{100-f} M_f$, and f is expressed in terms of atomic %.

2. An optical recording medium according to claim 1, wherein the element M includes at least one of In and Ge.

3. An optical recording medium according to claim 1, wherein the element M consists of Ag.

* * * * *

UNITED STATES PATENT AND TRADEMARK OFFICE
CERTIFICATE OF CORRECTION

| | | |
|---|---|---|
| PATENT NO. | : 7,083,894 B2 | |
| APPLICATION NO. | : 10/460167 | |
| DATED | : August 1, 2006 | |
| INVENTOR(S) | : H. Shingai et al. | |

It is certified that error appears in the above-identified patent and that said Letters Patent is hereby corrected as shown below:

At column 8, line 53 of the printed patent, "elements" should be --element--.

At column 8, line 58 of the printed patent, "expresses" should be --expressed --.

Signed and Sealed this

Twentieth Day of March, 2007

JON W. DUDAS
*Director of the United States Patent and Trademark Office*